(12) United States Patent
Khabashesku et al.

(10) Patent No.: US 8,907,000 B2
(45) Date of Patent: Dec. 9, 2014

(54) ORGANOCLAY-POLYUREA NANOCOMPOSITES

(75) Inventors: Valery Khabashesku, Houston, TX (US); Ramanan Krishnamoorti, Bellaire, TX (US); Baburaj Eranezhuth, Pearland, TX (US)

(73) Assignee: University of Houston System, Houston, TX (US)

( * ) Notice: Subject to any disclaimer, the term of this patent is extended or adjusted under 35 U.S.C. 154(b) by 160 days.

(21) Appl. No.: 12/896,074

(22) Filed: Oct. 1, 2010

(65) Prior Publication Data

US 2011/0081494 A1 Apr. 7, 2011

Related U.S. Application Data

(60) Provisional application No. 61/247,819, filed on Oct. 1, 2009.

(51) Int. Cl.
C08K 3/34 (2006.01)
B82Y 30/00 (2011.01)

(52) U.S. Cl.
CPC B82Y 30/00 (2013.01); C08K 3/346 (2013.01)
USPC .......................... 524/445; 524/589

(58) Field of Classification Search
USPC ....................................... 524/445
See application file for complete search history.

(56) References Cited

U.S. PATENT DOCUMENTS

| | | | | |
|---|---|---|---|---|
| 5,516,873 | A * | 5/1996 | Hicks et al. | 528/60 |
| 6,017,632 | A * | 1/2000 | Pinnavaia et al. | 428/403 |
| 6,605,684 | B2 * | 8/2003 | Primeaux et al. | 528/68 |
| 6,653,388 | B1 | 11/2003 | Barbee et al. | |
| 6,887,931 | B2 * | 5/2005 | Twardowska et al. | 524/445 |
| 2002/0119266 | A1 | 8/2002 | Bagrodia et al. | |
| 2003/0093107 | A1 | 5/2003 | Parsonage et al. | |
| 2004/0127627 | A1 | 7/2004 | Gilmer et al. | |
| 2009/0023518 | A1 | 1/2009 | Lee et al. | |

OTHER PUBLICATIONS

PCT/US2010/051073 International Search Report and Written Opinion, Jun. 15, 2011 (8 p.).

* cited by examiner

*Primary Examiner* — Vickey Nerangis
(74) *Attorney, Agent, or Firm* — Conley Rose, P.C.

(57) ABSTRACT

A nanocomposite having a nanomaterial dispersed into a polymer matrix, in one embodiment exfoliated nanoclay dispersed in a polyurea matrix. A method of making PU-nanocomposites for coatings for improved mechanical properties, in one embodiment the method comprises obtaining and treating a nanomaterial, dispersing the nanomaterial into a pre-polymer matrix, mixing the pre-polymer matrix under heating to form a coating; and depositing the coating on a substrate.

8 Claims, 6 Drawing Sheets

| Aromatic-based MDI resin prepolymer | | Aliphatic-based MDI resin prepolymer | |
|---|---|---|---|
| Two Component 2:1 (A:B) Volume Ratio Sealant Formulation DESMODUR® E 743 | | Two Component 1:1 Volume Ratio Aliphatic Sealant Formulation DESMODUR® XP 2617 | |
| | % by Wt. | | % by Wt. |
| Component A aromatic MDI | | Component A | |
| DESMODUR® E 743 | 100.00 | DESMODUR® XP 2617 | 100.00 |
| Component B | | Component B | |
| DESMOPHEN® NH 1420 | 79.91 | DESMOPHEN® NH 1420 | 61.20 |
| DESMOPHEN® NH 1220 | 16.29 | DESMOPHEN® NH 1220 | 10.74 |
| Molecular Sieves, A-4 | 2.00 | JEFFAMINE® D-2000 | 17.79 |
| TIOXIDE® TR93 | 1.00 | TINUVIN® 292 | 0.26 |
| SILQUEST® A-187 Silane | 0.20 | TINUVIN® 1130 | 0.26 |
| TINUVIN® 292 | 0.20 | IRGANOX® 1135 | 0.50 |
| TINUVIN® 1130 | 0.20 | Titanium dioxide, KRONOS® | 5.00 |
| IRGANOX® 1135 | 0.20 | Molecular Sieves, A-4 | 4.00 |
| | 100.00 | SILQUEST® A-187 SILANE | 0.25 |
| | | | 100.00 |
| Physical Properties | | Physical Properties | |
| Shore hardness | 98 (97) | Shore hardness | 95 (90) |
| Gel time (m) | 8.46 | Gel time (m) | 29 |
| Tensile strength, ASTM D 412, psi | 1415 | Tensile strength, ASTM D 412, psi | 1387 |
| Modulus at 100%, ASTM D 412, psi | 922 | Modulus at 100%, ASTM D 412, psi | 887 |
| Modulus at 200%, ASTM D 412, psi | 990 | Modulus at 200%, ASTM D 412, psi | 1043 |
| Modulus at 300% ASTM D 412, psi | 1090 | Modulus at 300% ASTM D 412, psi | 1322 |
| Maximum elongation, ASTM D 412,% | 600 | Maximum elongation, ASTM D 412, % | 329 |
| Tear resistance, ASTM D 624, Die C,pli | 504 | Tear resistance, ASTM D 624, Die C, pli | 242 |

FIGURE 1

| Sample name | Load at break (kg) | Extension at break (mm) | Strength at break (psi) | | | Elongation at break (%) | | |
|---|---|---|---|---|---|---|---|---|
| | | | Test | Ave | Increase | Test | Ave | Increase |
| a PU blank-5 | 2.110 | 29.25 | 1020 | | | 209 | | |
| a PU blank-6 | 2.402 | 23.75 | 914 | 984 | | 182 | 209 | |
| a PU blank-7 | 2.496 | 30.51 | 1018 | | | 235 | | |
| | | | | | | | | |
| a PU 2% C15A-1 | 3.902 | 43.00 | 2386 | | | 330 | | |
| a PU 2% C15A-2 | 4.778 | 38.00 | 2104 | 2307 | 135% | 292 | 318 | 52% |
| a PU 2% C15A-4 | 4.442 | 43.26 | 2432 | | | 332 | | |
| | | | | | | | | |
| arom PU blank-1 | 4.142 | 64.25 | 2280 | | | 450 | | |
| arom PU blank-2 | 4.098 | 53.50 | 3167 | 2928 | | 411 | 402 | |
| arom PU blank-3 | 3.031 | 41.26 | 3338 | | | 344 | | |
| | | | | | | | | |
| aromPU 1% C15A-1 | 4.765 | 65.25 | 3123 | | | 501 | | |
| aromPU 1% C15A-2 | 5.606 | 77.75 | 3650 | 3328 | 14% | 598 | 538 | 34% |
| aromPU 1% C15A-3 | 3.502 | 51.50 | 3212 | | | 515 | | |

Legend: *a* – aliphatic PU formulation, *arom* – aromatic PU formulation

*C15A* – natural nanoclay Cloisite 15A with long chain alkyl tail

FIGURE 3

ORGANOCLAY-POLYUREA NANOCOMPOSITES

CROSS-REFERENCE TO RELATED APPLICATIONS

This application claims the benefit under 35 U.S.C. §119(e) of U.S. Provisional Patent Application No. 61/247,819 filed Oct. 1, 2009, the disclosure of which is hereby incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by Air Force grant FA8650-05-D-1912

FIELD OF THE INVENTION

The present invention relates generally to nanomaterials and more specifically, to the synthesis and use of organically modified nanoclay (ONC)-based polyurea (PU) nanocomposites.

DESCRIPTION OF THE RELATED ART

Excellent mechanical properties of pure polyurea (PU) and polyurea-blend polymers are very attractive for the development of advanced materials that can be used in important industrial applications. The base PU polymer is a thermoset elastomer that is derived from the reaction of an isocyanate component and a synthetic resin blend component consisting mostly of poly(ether)amines. Unmodified polyureas can reach tensile strengths of 6000 psi and over 500% elongation. Additionally, polyureas have high impact resistance and mechanical deformation or dissipation characteristics. The mechanical properties, such as temperature resistance, hardness, stiffness, impact resistance, and elongation are useful in coverings, coatings, and structural support applications. As such, these materials are finding new applications in increasing the survivability of structures under impact loading, including those encountered in blasts, ballistic events, and natural disasters.

Nanofillers may include any nanomaterial, including particles, rods, crystals, or sheets (platelets) having at least one dimension that is less than about 1 micron (1000 nm). Nanofillers are typically incorporated into a base polymer or resin matrix. Research unrelated to PU nanocomposites has shown that nanofillers typically improve modulus, strength, and the ductility of the elastomeric polymer matrices. Although the past two decades of research has focused on improving the mechanical properties of polymeric materials, and includes the incorporation of nanofillers, studies of PU-nanocomposites have been limited to rubber-like polyurethanes to date.

The implications for elastomeric PU-nanocomposited have been so far undetermined, especially with respect to improving the mechanical properties favorable for blast-resistant coatings. As such there is a need in the industry for a PU-nanocomposite with increased tensile strength and ductility for applications in coating applications.

SUMMARY

A composition comprising: a hardenable matrix; and a nanomaterial. In embodiments, the hardenable matrix comprises a polymer or elastomer. In certain instances, the matrix is a polyurea. The nanomaterial comprises at least one chosen from the group consisting of nanotube, a nanodot, a nanoplatelet, a nanorod, a nanoclay, and combinations thereof, and in certain instances, the nanomaterial comprises a nanoclay.

A method for making a coating comprising: obtaining a nanomaterial; treating the nanomaterial; dispersing the nanomaterial into a pre-polymer matrix; mixing the pre-polymer matrix under heating to form a coating; and depositing the coating on a substrate. In certain instances, depositing the coating comprises curing the coating.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

The present disclosure may be better understood, and its numerous features and advantages made apparent to those skilled in the art by referencing the accompanying figures.

FIG. 1 illustrates compositions of commercial aromatic and aliphatic castable PU systems.

FIG. 3 illustrates tensile test data obtained on dogbone samples of PU and PU-nanoclay composites.

DETAILED DESCRIPTION

Figure 2:
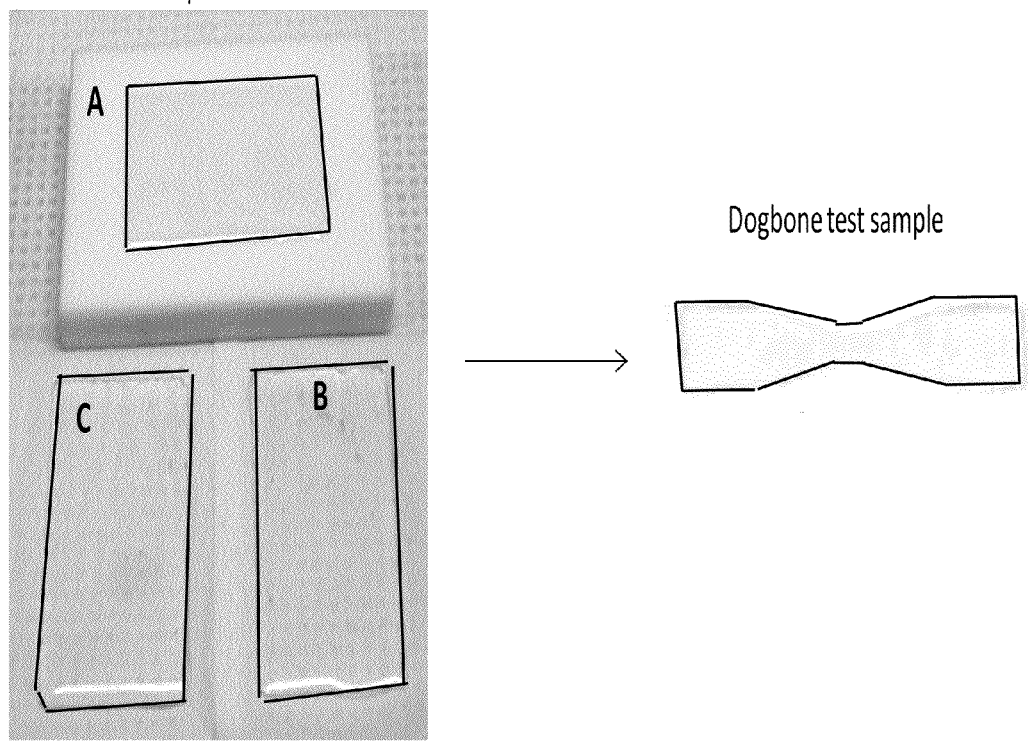
FIG. 2 illustrates mold casted rectangular and dogbone PU test samples.

Overview:

The present disclosure relates to improved compositions and compounds for use in structural coatings. More specifically the present disclosure relates to coatings incorporating nanocomposites, comprising a nanofiller incorporated into polymer matrix. The polymer matrix comprises any bulk material comprising covalently linked monomers in a viscous liquid, semi-solid, or solid form. The bulk material may comprise an elastomeric or a plastic polymer, without limitation. A nanofiller comprises a solid material with at least one dimension less than about one micron or 1 micrometer (1μ, 1000 nm). Without limitation, a nanofiller may comprise any nanoparticle such as a nanotube, a nanodot, a nanoplate, a nanorod, a nanoclay, and combinations thereof. Further, a nanoparticle may comprise a metallic, a semi-metallic, or an organic molecule, without limitation. In nonlimiting examples, the nanocomposite may include additional modifiers, such as resins, hardeners, or plasticizers.

Matrix:

In embodiments, the polymer matrix comprises a polyurea. Without limitation by theory, polyurea is an elastomeric polymer formed from the reaction product of an isocyanate component and a synthetic resin. The isocyanate component comprises an aliphatic or aromatic isocyanate. The isocyanate may be a monomer, polymer, or a reaction variant of other isocyanates, without limitation. In instances, the isocyanate is a quasi-prepolymer or a prepolymer. In certain instances, the polyurea comprises aliphatic or aromatic methylene diisocyanate (MDI) pre-polymer.

In embodiments, the resin is any synthetic or natural resin. In instances, the resin comprises an organic functional group. In certain instances the resin is a polyamine resin. The synthetic resin comprises a polyaspartate resin. In instances, the resin may be mixed with other components, such as but not limited to plasticizers, cure agents, and hardeners. In certain instances, the other components may act to slow or alter the curing time of the polymer matrix. In certain instances, the synthetic resin comprises a polyaspartate ester. In further instances, the synthetic resin is mixed with sterically hindered secondary amine cure agents. In a nonlimiting example, alkylammonium with various terminal functional groups, such as, but not limited to alkyl, hydroxyl, and amino, is a sterically hindered secondary amine cure agents.

Nanofiller:

In embodiments, the nanofiller comprises a nanoclay. A nanoclay comprises any naturally occurring nanoplate or nanoplatelet structure, having a generally planar shape. A nanoclay nanoplatelet may have a length and width of any dimension, and a thickness that is less than about 1 µm. Alternatively, the nanoclay has a thickness that is less than about 100 nm; and certain instances, the nanoclay thickness is less than about 50 nm. Further, the nanoclay nanoplatelets may have more than one dimension that is less than about 1 µm. Alternatively, each dimension is less than about 100 nm; and certain instances, each dimension is less than about 50 nm.

In embodiments, a nanoclay comprises any inorganic nanomaterial generally comprising silica, alumina, or combinations thereof. In certain instances, a nanoclay is any hydrous aluminum phyllosilicate, and may further comprise variable concentrations of iron, magnesium, alkali metals, alkaline earth metals, and other cations. Without limitation by theory, a nanoclay comprises a smectite clay, such as montmorillonite clay, having at least one dimension in the nanometer range. Smectite clay comprises any clay that at least forms flat hexagonal sheets. Additionally, smectite clay comprises any clay with an octahedral sheet sandwiched between two tetrahedral sheets. In certain instances, montmorillonite clay comprises hydrated sodium calcium aluminum magnesium silicate hydroxide, with variable atomic ratios.

In embodiments, the nanoclay may be surface modified, functionalized, exfoliated or otherwise treated and dispersed to increase the gallery distance of the nanoclay. Without limitation by theory, increasing the gallery distance comprises de-layering the nanoclay to form monolayer nanoplatelets of the nanoclay. In certain instances, the gallery distance is increased by curing in an organic solution or solvent. In a nonlimiting example, the nanoclay is organically modified by dispersion and exfoliation in an amine solution. In embodiments, the exfoliated nanoclay is cured in an amine solution under vacuum. Additionally, the exfoliated nanoclay may be heated during curing to a temperature between about 40° C. and about 120° C.; alternatively, to a temperature between about 50° C. and about 100° C.; and in certain instances, to a temperature between about 60° C. and about 80° C. In embodiments, an exfoliated nanoclay comprises an organically-modified nanoclay (ONC).

Nanocomposite:

In embodiments the isocyanate and resin are mixed to form a PU-component. In instances where the isocyanate is an aliphatic isocyanate pre-polymer (e.g. isophorone diisocyanate, IPDI), the isocyanate to resin ratio is between about 0.1:1 and about 6:1, alternatively, between about 0.5:1 and about 3:1, and in certain compositions the aliphatic isocyanate pre-polymer (e.g. IPDI), the isocyanate to resin ratio is about 1:1. In instances where the isocyanate is an aromatic isocyanate pre-polymer (e.g. MDI), the isocyanate to resin ratio is between about 0.1:1 and about 6:1, alternatively, between about 0.5:1 and about 3:1, and in certain compositions the aromatic isocyanate pre-polymer (e.g. MDI), the isocyanate to resin ratio is about 2:1. In certain instances the aromatic isocyanate pre-polymer (e.g. MDI) is derived from an aliphatic isocyanate pre-polymer (e.g. IPDI), in instances the aliphatic-derived aromatic isocyanate pre-polymer (e.g. MDI), the isocyanate to resin ratio is between about 0.1:1 and about 6:1, alternatively, between about 0.5:1 and about 3:1, and in certain compositions the aliphatic-derived aromatic isocyanate pre-polymer (e.g. MDI), the isocyanate to resin ratio is about 2:1.

In embodiments after mixing, the PU-component is heated and degassed to remove gases from the matrix. In instances, the PU-component is heated to a temperature between about 40° C. and about 140° C.; alternatively, to a temperature between about 50° C. and about 120° C.; and in certain instances, to a temperature between about 60° C. and about 90° C. In certain instances, the PU-component is heated for between about 1 hr and about 6 hrs; alternatively, heated for between about 2 hrs and about 4 hrs. In additional embodiments, during heating the PU-component is mechanically agitated. In a non-limiting example, the PU-component is stirred during heating to facilitate mixing and degassing. The heating and stirring are conducted under vacuum to facilitate degassing the matrix.

In embodiments, the nanoclay is mixed into the PU-component to form a PU-nanocomposite. In instances, the nanoclay is mixed with the PU-component to a nanoclay concentration of between about 0.01 wt % and about 25 wt %; alternatively between about 0.1 wt % and about 15 wt %; and further between about 1 wt % and about 10 wt % of the total composition weight. In certain instances, the nanoclay is mixed into an aliphatic PU-component to a nanoclay weight concentration of between about 0.01 wt % and about 25 wt %; alternatively between about 0.1 wt % and about 15 wt %; and further between about 1 wt % and about 10 wt % of the total composition weight. Further, the nanoclay is mixed into an aromatic methylene diisoncyanate to a nanoclay weight concentration of between about 0.01 wt % and about 25 wt %; alternatively between about 0.1 wt % and about 15 wt %; and further between about 1 wt % and about 10 wt % of the total composition weight. Without limitation by theory, the nanoclay concentration may exceed 25 wt % of the total composition weight in any isocyanate component when the nanoclay nanoplatelets are monodisperse, have multiple dimensions below about 1 µm, or combinations thereof. In these instances, the nanoclay concentration in PU-nanocomposite may be greater than about 33 wt %, or in certain instances, to greater than about 50 wt % of the total composition weight.

In alternative embodiments, the nanoclay is mixed with the isocyanate component prior to hardening in contact with the resin. In certain instances, the nanoclay is mixed into the isocyanate to a nanoclay concentration between about 0.01 wt % and about 25 wt %; alternatively between about 0.1 wt % and about 15 wt %; and further between about 1 wt % and about 10 wt % of the total composition weight. In certain instances, the nanoclay is mixed into an aliphatic methylene diisoncyanate to a nanoclay concentration between about 0.01 wt % and about 25 wt %; alternatively between about 0.1 wt % and about 15 wt %; and further between about 1 wt % and about 10 wt % total composition weight. Further, the nanoclay is mixed into an aromatic methylene diisoncyanate to form a nanoclay concentration between about 0.01 wt % and about 25 wt %; alternatively between about 0.1 wt % and about 15 wt %; and further between about 1 wt % and about 10 wt % total composition weight. Without limitation by theory, the nanoclay concentration may exceed 25 wt % in the isocyanate component when the nanoclay nanoplatelets are monodisperse or have multiple dimensions below about 1 μm. In these instances, the nanoclay concentration in isocyanate may be greater than about 33 wt %, or in certain instances, to greater than about 50 wt % total composition weight.

In embodiments the isocyanate-nanoclay is heated and degassed. In instances, the isocyanate-nanoclay is heated to a temperature between about 40° C. and about 140° C.; alternatively, to a temperature between about 50° C. and about 120° C.; and in certain instances, to a temperature between about 60° C. and about 90° C. In certain instances, the isocyanate-nanoclay is heated for between about 1 hr and about 6 hrs; alternatively heated for between about 2 hrs and about 4 hrs.

In embodiments, the isocyanate-nanoclay is contacted with the resin to form the PU-nanocomposite. In instances where the isocyanate is an aliphatic isocyanate pre-polymer (e.g. IPDI), the isocyanate to resin ratio is between about 0.1:1 and about 6:1; alternatively, between about 0.5:1 and about 3:1, and in certain compositions the aliphatic isocyanate pre-polymer (e.g. IPDI), the isocyanate to resin ratio is about 1:1. In instances where the isocyanate is an aromatic isocyanate-nanoclay pre-polymer (e.g. MDI), the isocyanate to resin ratio is between about 0.1:1 and about 6:1, alternatively, between about 0.5:1 and about 3:1, and in certain compositions the aromatic isocyanate-nanoclay pre-polymer (e.g. MDI), the isocyanate to resin ratio is about 2:1. In certain instances the aromatic isocyanate pre-polymer (e.g. MDI) is derived from an aliphatic isocyanate pre-polymer (e.g. IPDI), in instances the aliphatic-derived aromatic isocyanate pre-polymer (e.g. MDI), the isocyanate to resin ratio is between about 0.1:1 and about 6:1, alternatively, between about 0.5:1 and about 3:1, and in certain compositions the aliphatic-derived aromatic isocyanate pre-polymer (e.g. MDI), the isocyanate to resin ratio is about 2:1.

In embodiments after mixing, the PU-nanocomposite is heated and degassed to remove gases from the matrix. In instances, the PU-nanocomposite is heated to a temperature between about 40° C. and about 140° C.; alternatively, to a temperature between about 50° C. and about 120° C.; and in certain instances, to a temperature between about 60° C. and about 90° C. In certain instances, the PU-nanocomposite is heated for between about 1 hr and about 6 hrs; alternatively heated for between about 2 hrs and about 4 hrs. Additionally in embodiments, during heating the PU-component is mechanically agitated. In a non-limiting example, the PU-component is stirred. The heating and stirring are conducted under vacuum to facilitate degassing the PU-nanocomposite matrix.

Coatings:

In embodiments the PU-nanocomposite is a coating. In instances, the PU-nanocomposite is deposited on substrate. Deposition may comprise, spraying, pouring, spreading, sputtering, painting, or any other means known to a skilled artisan. In certain instances, deposition may comprise molding the PU-nanocomposite to fit a substrate. A substrate may comprise a surface, a wall, a building, an object, a mold, or combinations thereof. After deposition, the PU-nanocomposite is cured. Curing the PU-nanocomposite comprises allowing the PU-nanocomposite to remain in-situ for at least about 5 minutes; and alternatively at least about 2 hrs; alternatively, at least about 8 hrs; and in some instances, at least about 24 hrs. In some instances, increased cure time results in increased impact resistance and durability of the PU-nanocomposite coating. In instances, a modifier chosen from resins, hardeners, plasticizers, or other modifiers known to a skilled artisan, is used. Without limitation by theory, a modifier alters the time to cure the PU-nanocomposite. In certain instances, a modifier comprises sterically-hindered, secondary amine cure agent. In certain instances, curing is conducted at a temperature of less than about 120° C. Alternatively, curing occurs at less than about 80° C.; and in certain instance curing occurs at ambient conditions. As known to one skilled in the art, curing may occur during transport of a substrate from a site of deposition to a site of installation. In a non-limiting example, a substrate may be a pre-fabricated wall that is coated with a PU-nanocomposite and transported to a building site.

While the composition described herein specifically focuses on certain types of organoclay polyurea-composites, one of ordinary skills in the art, with the benefit of this disclosure, would recognize the extension of the approach to other systems. The particular embodiments disclosed above are illustrative only, as the present composition may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present composition.

EXAMPLES

Organically modified nanoclay (ONC) based polyurea (PU) nanocomposites described herein have been fabricated using commercial aliphatic, aliphatic-derived, or aromatic methylene diisocyanate (MDI) pre-polymer resins and polyaspartate ester sterically hindered secondary amine cure agents. Nanocomposite processing and fabrication methodology are demonstrated on dispersion and exfoliation of ONC in amine cure followed by degassing in vacuum at elevated temperature (60-80° C.), mixing with MDI resin, casting into a mold and curing at ambient temperature. The mechanical test data obtained on INSTRON 4467 instrument on 12 test samples of neat PU and PU-ONC nanocomposite material and DMA tests demonstrate an increase of tensile strength of aliphatic PU filled with 2 wt % of commercial ONC (Cloisite 15A), by an average of 135%, accompanied with the increase in elongation at break by 53% and increase in glass transition temperature (Tg) by about 20° C. In comparison, aromatic PU filled with 1 wt % of the same nanoclay showed 14% increase in tensile strength and 34% increase in elongation. The ONC-PU composites and developed methodology presented herein can be readily adapted, scaled up and transferred to industry for reinforced, corrosion resistant coatings and adhesives applications over metals and concrete in bridges, buildings, floors, piping and other infrastructure components.

Methodology:

Existing industrial polyurea spray coating and reaction injection molding technologies typically use PU with very fast gel times—typically within seconds. In absence of special equipment, such PUs are very difficult to work with in the lab since they do not allow enough time for proper mixing of the PU components and its casting into the mould to fabricate good quality mechanical test coupons. Therefore, MDI (methylene diisocyanate), which are prepolymers combining moderate viscosity with relatively low nitrogen-carbon-monoxide (NCO) content, with gel times not faster than 5 minutes need to be used in the lab. Such castable PU systems have recently been developed by BAYER® Materials Research Center. Both systems described herein use a mixture of polyaspartate ester secondary amines as a hardener that slows down the curing reactions of PU, making it suitable for handling during the casting and composite fabrication in the lab. One system used herein is based an aromatic-based MDI resin prepolymer while the other system is an aliphatic-based MDI resin prepolymer. These PU compositions developed by BAYER® are described in FIG. 1. The present application may use the other organic and inorganic additives listed in this Table (such as Molecular Sieves A-4, TIOXIDE® TR93, SILQUEST® A-187 Silane, TINUVIN® 292, TINUVIN® 1130, IRGANOX® 1135, and Titanium dioxide KRONOS®). The current examples did not use them in order to study an unmasked effect of an organoclay filler on the properties of PU.

Fabrication of Dogbone Composite Samples of Aliphatic and Aromatic PU Formulations:

First, two Teflon molds for casting and fabrication of rectangular shaped PU composite samples for mechanical testing have been made in the machine shop as shown in FIG. 2. Second, the PU components are degassed in vacuum oven at 80° C. for 3 hours until complete visual removal of bubbles. Then, the components are mixed at about 60° C. (which is the temperature used in spray coating technology) either in 1:1 (aliphatic) or 2:1 (aromatic) volume, cast into a Teflon mold, and left curing overnight at room temperature. The processing and fabrication experiments produce clear and uniform sample coupons of PU as shown in FIG. 2.

A nanoclay-PU composite sample coupon is made with 2 wt % Cloisite 15A in case of aliphatic PU and with 1 wt % of the same nanoclay as filler in case of aromatic PU. The nanoclay powder is exfoliated by placing into a Component B secondary amine formulation and then stirred at 80° C. for 3 hours. This is followed by degassing of the dispersion and aliphatic or aromatic resin DESMODUR XP2167 or E743 (component A) in vacuum oven at 80° C. The components are mixed either in 1:1 ratio in case of aliphatic PU or in 2:1 ratio in case of aromatic PU, then cast into the mold and left curing overnight. The composite samples produced are clear and light-yellow colored. The samples are cut into dogbone-shaped samples for tensile strength testing and rectangular samples for DMA tests. The samples are tested not earlier than 7 days after casting.

Figure 4:
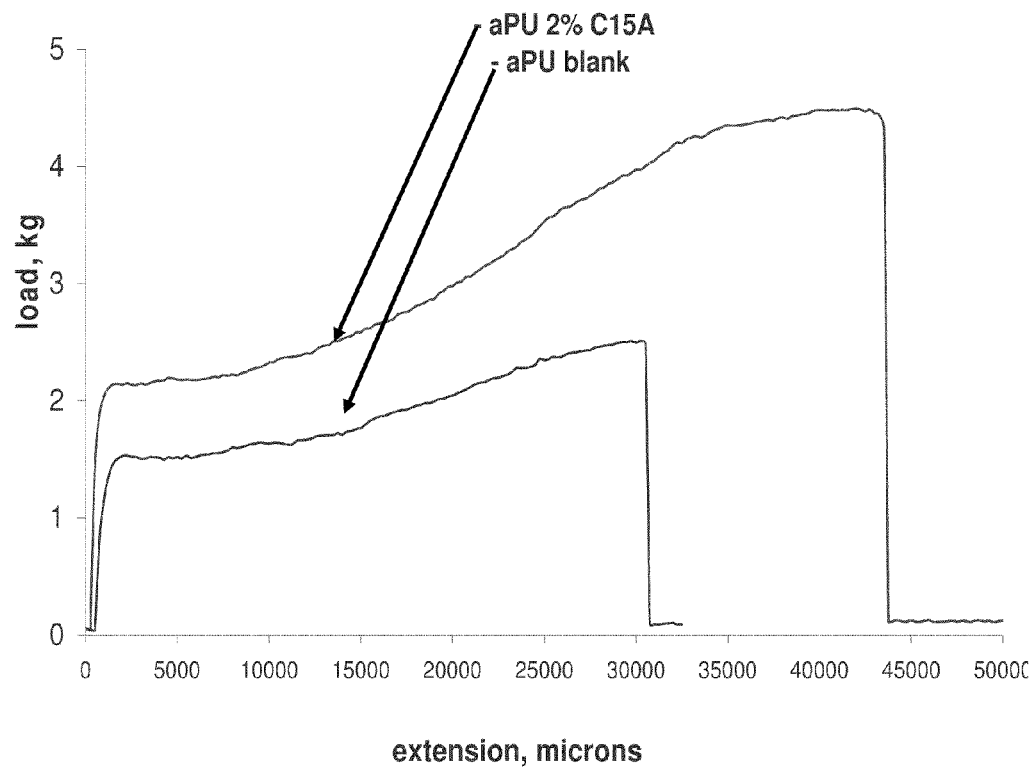
FIG. 4 illustrates a comparison of tensile test data plotted for two chosen samples of neat PU and PU-2 wt. % Cloisite 15A composite.
Figure 5:
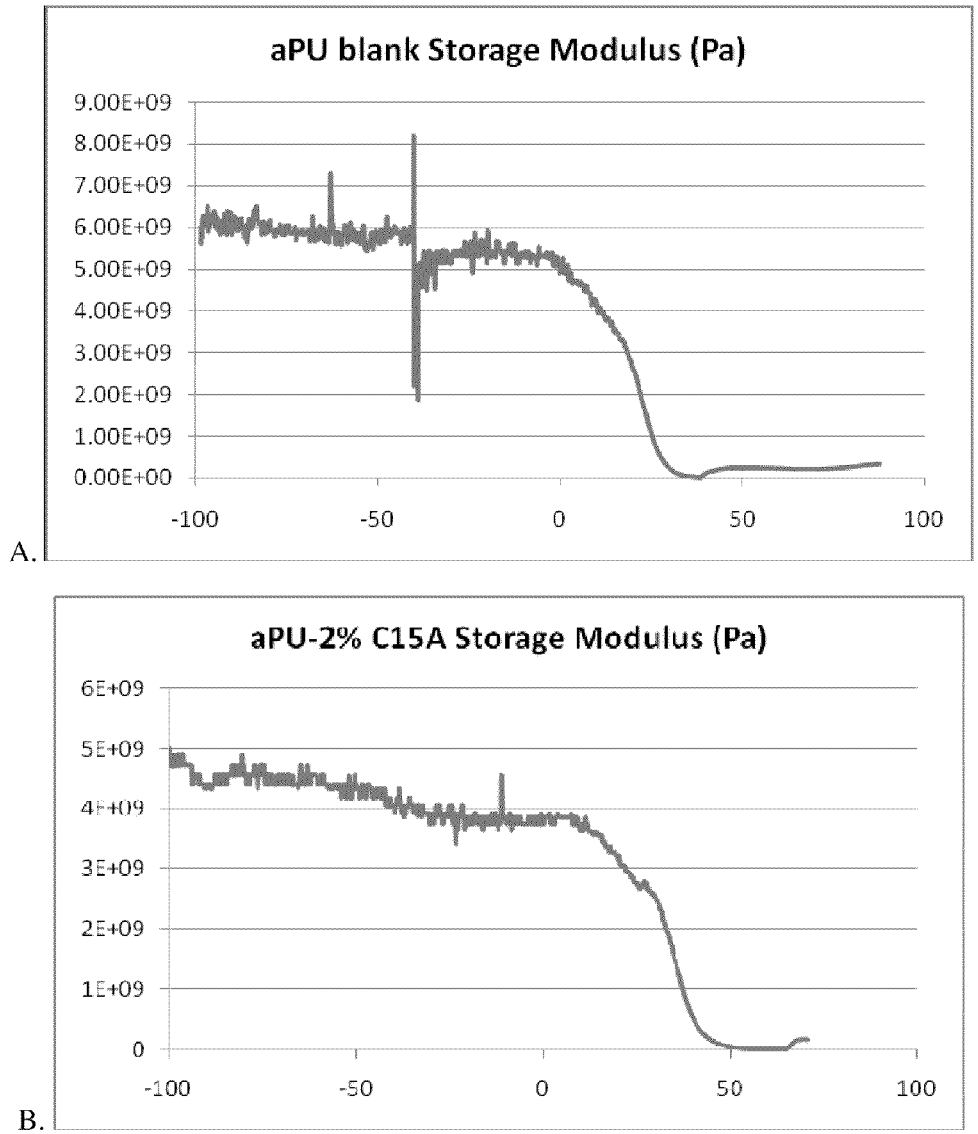
FIG. 5 illustrates the Storage Modulus vs. Temperature curves from DMA of blank aliphatic PU (A) and PU 2% Cloisite 15A composite (B)
Figure 6:
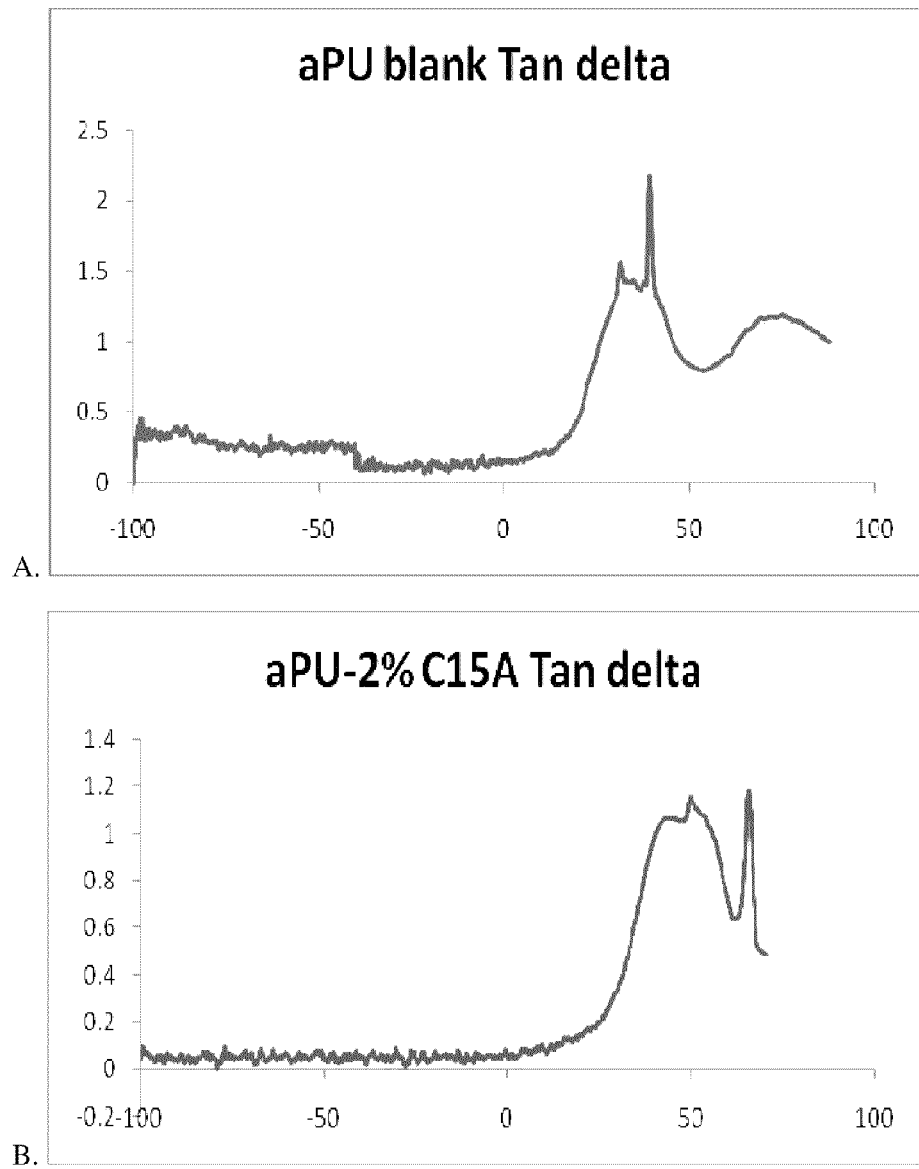
FIG. 6 illustrates the Tan Delta vs. Temperature curves from DMA of blank aliphatic PU (A) and PU 2% Cloisite 15A composite (B) showing increase by about 20° C. in glass transition temperature for PU-organoclay nanocomposite

Mechanical Property Tests Using INSTRON and DMA Instruments:

The tensile test data obtained on INSTRON 4467 instrument on 12 test samples, 3 from each neat PU and PU-nanoclay composite material, are summarized in FIG. 3 and illustrated in FIG. 4 (shown as an example). The results demonstrate a significant increase of tensile strength of aliphatic PU filled with 2 wt % of nanoclay (Cloisite 15A), by an average of 135%. This is also accompanied with the increase in elongation at break by 52%. In comparison, aromatic PU filled with 1 wt % of nanoclay showed only marginal (14%) increase in tensile strength however a notable (34%) elongation. The use of lower amount of nanoclay in the case of aromatic PU was because of increased viscosity concern since the nanoclay had to be dispersed in a two times smaller volume of hardener than one used for curing of aliphatic PU. The DMA tests are done on aliphatic PU neat and 2 wt % nanoclay composite samples. They confirm a modification of PU properties through addition of the nanoclay filler by showing a decrease in storage modulus as shown in FIG. 5 and an increase in glass transition temperature as shown in FIG. 6 for PU-nanoclay composite as compared to neat PU.

Discussion:

The present composition demonstrates a significant reinforcement in tensile strength and an increase of elastic properties of aliphatic PU due to dispersed organically modified nanoclay (Cloisite 15A) particles. Based on the results disclosed herein, one can reasonably expect that other clays, such as but not limited to the Montmorrillonite A clay intercalated with variable amounts (10 to 100 mol %) of organic surfactants such as, but not limited to alkylammonium with various terminal functional groups (such as, but not limited to alkyl, hydroxyl, and amino) allow for the exfoliation of organoclay that are capable of bonding to PU during fast curing process. The relationships between the functionalities of organoclays and the loadings of organoclay into PU impact the mechanical properties of the composite materials.

We claim:

1. A composition comprising:
   a hardenable polyurea matrix comprising an polyaspartate ester resin, and at least one modifier having a sterically-hindered alkylammonium; and
   a monolayer of nanoclay comprising an isocyanate component modifier, the monolayer of nanoclay having a concentration of from about 0.01 wt % to about 50 wt % of the total weight composition.

2. The composition of claim 1 wherein the isocyanate component comprises at least one component selected from the group consisting of aliphatic isocyanates, aromatic isocyanates, and combinations thereof.

3. The composition of claim 1, wherein the monolayer of nanoclay comprises a concentration of from about 0.1 wt % to about 10 wt % of the total weight composition.

4. The composition of claim 1 wherein the at least one modifier is selected from the group consisting of hardeners, plasticizers, and combinations thereof.

5. A composition comprising:
   a hardenable polyurea matrix comprising an polyaspartate ester resin, and at least one modifier having a sterically-hindered alkylammonium; and
   a dispersible nanomaterial comprising an isocyanate component modifier, the dispersible nanomaterial having a concentration of from about 0.01 wt % to about 50 wt % of the total weight composition, and wherein the dispersible material comprises monolayer nanoplatelets of nanoclay.

6. The composition of claim 5 wherein the isocyanate component comprises at least one component selected from the group consisting of aliphatic isocyanates, aromatic isocyanates, and combinations thereof.

7. The composition of claim 5, wherein the monolayer of dispersible nanomaterial comprises a concentration of from about 0.1 wt % to about 10 wt % of the total weight composition.

8. The composition of claim 5 wherein the at least one modifier is selected from the group consisting of hardeners, plasticizers, and combinations thereof.

* * * * *